Oct. 16, 1951     L. ROSSETTO     2,571,166
POWER PLANT LUBRICATION SYSTEM
Filed Nov. 18, 1948
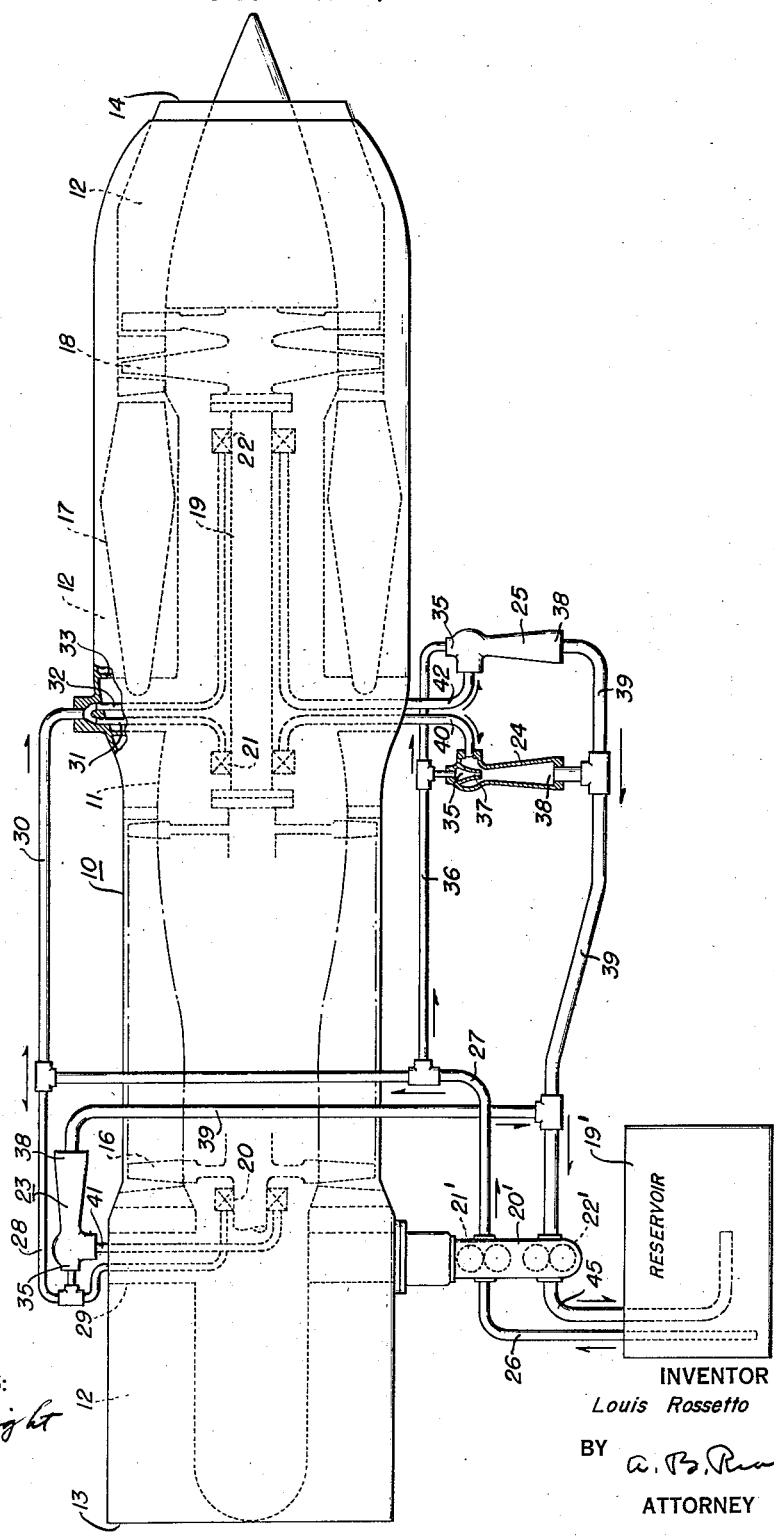
WITNESSES:
John M. Wright
V. W. Novak
INVENTOR
Louis Rossetto
BY
ATTORNEY Patented Oct. 16, 1951

2,571,166

UNITED STATES PATENT OFFICE 2,571,166

POWER PLANT LUBRICATION SYSTEM

Louis Rossetto, New York, N. Y., assignor to Westinghouse Electric Corporation, East Pittsburgh, Pa., a corporation of Pennsylvania Application November 18, 1948, Serial No. 60,809

7 Claims. (Cl. 184—6)

This invention relates to lubricating systems for power plants, and has for an object the provision of improved lubricating and scavenging apparatus for an aviation engine.

In the operation of an aviation gas turbine engine at high altitudes, some decline in the efficiency of the lubrication system may be encountered due to the difficulty of obtaining adequate scavenging of the lubricating oil from the lubrication zones of the apparatus. In a conventional lubrication system, a single supply pump is provided for delivering oil from the usual reservoir to the several bearings and auxiliary drive elements, and separate scavenge pumps are utilized for effecting withdrawal of excess oil from the respective bearings and gears by way of individual scavenge lines. The altitude performance of such a system is to some extent dependent upon the minimum absolute inlet pressure at which the scavenge pumps will operate efficiently. In addition, the weight of a multiplicity of individual scavenge pumps may be appreciable, while if several scavenge units are assembled in a unitary housing to save weight, the necessarily extended scavenge conduits may introduce undesirable potential head differences and losses due to friction in the conduits.

It is an object of the present invention to provide an improved lubrication system for a gas turbine engine, in which adequate scavenging is ensured through use of the oil under pressure as a motive medium.

Another object of the invention is the provision of improved lubrication apparatus eliminating the requirement of a separate scavenge pump for each zone to be scavenged.

A further object of the invention is the provision of improved aviation gas turbine lubricating apparatus including scavenge means cooperable with a scavenge pump for obviating any limitation on efficiency incident to operation of the engine under atmospheric pressure below the minimum absolute inlet pressure for the scavenge pump.

Another object is to provide improved lubrication apparatus for a gas turbine power plant including a scavenge system utilizing a minimum of exposed scavenge conduits and movable parts subject to wear.

These and other objects are effected by the invention as will be apparent from the following description and claims taken in connection with the accompanying drawing, forming a part of this application, in which:

The single figure is a diagrammatic elevational view of a typical gas turbine power plant having a lubrication system constructed in accordance with the invention.

The conventional aviation gas turbine engine illustrated schematically in the drawing comprises a cylindrical outer casing structure 10 and a sectional inner core structure 11 defining an annular passageway 12, which extends longitudinally through the engine from an air intake opening 13 to a discharge nozzle 14. The casing structure 10 is adapted to be mounted in or on the fuselage or wing of an aircraft (not shown), with the intake opening 13 pointed forwardly or in the direction of flight. Disposed in the casing structure 10 along the axis of the engine are the operating elements thereof, comprising an axial flow compressor 16, annular fuel combustion apparatus 17, and a turbine 18, which is operatively connected to the compressor through the medium of a shaft 19, the entire rotor assembly thus formed being journaled in bearings 20, 21 and 22 which are suitably supported in the casing structure 11 by means of struts (not shown).

In operation, air drawn into the intake opening 13 and compressed by the compressor 16 is delivered to the combustion apparatus 17 to support combustion of fuel therein. The heated motive fluid thus provided is then expanded through the turbine 18 and finally discharged by way of the nozzle 14, usually in the form of an axial jet producing a propulsive thrust.

According to the invention, the lubrication system for the apparatus, as shown in schematic form in the drawing, may comprise an oil reservoir 19', pump apparatus 20' having a common drive connection (not shown) and including a supply pump 21' and a scavenge pump 22', and a plurality of ejectors for the respective bearings, such as those indicated at 23, 24 and 25. The supply pump is operative to draw lubricating oil from the reservoir 19' by way of a pipe 26 and to feed it under pressure to the lubrication zones or bearings through a delivery conduit 27. The conduit 27 has a branch 28 leading to the thrust bearing 20 through a radial strut 29 of the engine, and a branch 30 communicating with conduits 31 and 32 which lead through a strut 33 to the respective bearings 21 and 22.

The ejectors 23, 24 and 25 are constructed and arranged to operate in response to the pressure differential established between the discharge of the supply pump and the intake of the scavenge pump for withdrawing excess oil from the associated bearings of the power plant. As representative of each of the ejectors, the ejector 24 is shown in section as comprising an inlet portion 35 communicating with the oil delivery conduit 27 by way of a conduit 36, a restricted throat or Venturi passage 37, and a diverging portion or diffusing passage 38 which communicates with the intake of the scavenge pump 22 through a scavenge conduit 39. The Venturi passage 37 also communicates by way of a suction conduit 40 with the scavenge zone of bearing 21. The ejectors 23 and 25 are similar in construction and arrangement, each having an inlet portion 35 and an outlet portion 38, with an intermediate throat portion connected to the corresponding zone of the engine to be scavenged. Thus, the ejector 23 is interposed between the oil delivery conduit 28 and scavenge conduit 39 for scavenging the bearing 20 by way of a suction conduit 41, while the ejector 25 is connected between the conduits 36 and 39 for scavenging the bearing 22 through a suction conduit 42. It will be noted that the ejectors are preferably disposed near the corresponding zones to be scavenged, so that the respective suction conduits 40, 41 and 42 may be relatively short.

In operation, the pump 21' is operative to supply oil under pressure through the connected conduits 27, 28 and 30 to the various bearings. At the same time, some of the oil under pressure is supplied to the inlet 35 of each of the ejectors 23, 24 and 25 for creating the partial vacuum required in the scavenging system. Referring to the ejector 24 by way of example, oil under pressure flowing from the inlet 35 through the venturi 37 creates a partial vacuum in the suction conduit 40, through which oil scavenged from the bearing 21 is thus entrained and carried on through the diverging passage 38 and scavenge conduit 39 to the intake of the scavenge pump 22', which then returns the oil through a conduit 45 to the reservoir 19'. As the oil passes through the diverging portion 38 of the ejector, the pressure thereof is somewhat increased, so that the intake of the scavenge pump 22' receives the oil under sufficient pressure to ensure proper operation of the the pump regardless of its own minimum absolute inlet pressure characteristics, even when the apparatus is operated at high altitude.

From the foregoing it will now be seen that by providing suitably designed ejectors in close proximity to each oil scavenge zone in the lubrication system of a gas turbine engine in accordance with the invention, a single scavenge pump can be utilized for efficiently scavenging the system without limitation due to high altitude flight, and that the resultant reduction in the number of operating parts and conduits required will facilitate installation and maintenance of the equipment on either an existing engine or an engine of advanced design.

While the invention has been shown in but one form, it will be obvious to those skilled in the art that it is not so limited, but is susceptible of various changes and modifications without departing from the spirit thereof.

What is claimed is:

1. In a power plant having a rotor journaled on a plurality of bearings, lubrication apparatus therefor comprising a supply pump having its outlet connected to said bearings and operative to deliver lubricant under pressure to said bearings, a scavenge pump, and ejector means interposed in a communication connecting the outlet of said supply pump to the intake of said scavenge pump and subject to pressure differential between the discharge side of said supply pump and the intake side of said scavenge pump, said ejector means including a Venturi passage connected to said bearings for withdrawing excess lubricant from said bearings.

2. In a power plant having a rotor journaled on a plurality of bearings, lubrication apparatus therefor comprising a supply pump having a discharge outlet connected to said bearings and operative to deliver lubricant under pressure to said bearings, a scavenge pump, and a plurality of ejectors having Venturi passages connected to said bearings for withdrawing excess lubricant therefrom, each of said ejectors having a motivating fluid inlet connected to the outlet of said supply pump and an exhaust outlet connected to the inlet of said scavenge pump, said ejectors being actuated by flow of fluid pressure from the discharge side of said supply pump to the intake side of said scavenge pump.

3. In a gas turbine power plant having a turbo-compressor rotor journaled on a plurality of bearings, lubrication apparatus therefor comprising a supply pump having a discharge outlet connected to said bearings, a scavenge pump, and ejector means subject to pressure differential between the discharge side of said supply pump and the intake side of said scavenge pump for withdrawing excess lubricant from said bearings, each of said ejector means comprising a tubular structure having a converging motivating fluid entryway communicating with the discharge outlet of said supply pump and with a Venturi passage, a diverging discharge chamber communicating with said Venturi passage and with the intake of said scavenge pump, and a suction inlet connecting said Venturi passage with the associated bearing and through which excess lubricant is drawn from the bearing into said Venturi passage for discharge along with the motivating stream of lubricant flowing to the intake of the scavenge pump.

4. In a gas turbine power plant having a turbo-compressor rotor journaled on a plurality of bearings, lubrication apparatus therefor comprising a lubricant reservoir, a supply conduit communicating with said bearings, a lubricating pump having a discharge outlet connected to said conduit and operative to supply lubricant under pressure therethrough from said reservoir to said bearings, a scavenge conduit, a scavenge pump discharging into said reservoir and having an intake communicating with said scavenge conduit, and ejectors interposed in communications between said supply and scavenge conduits and having Venturi passages connected to the respective bearings for utilizing circulating lubricant as a motive medium to eject excess lubricant from said bearings into said scavenge conduit.

5. In a gas turbine power plant having a turbo-compressor rotor journaled on a plurality of bearings, lubrication apparatus therefor comprising a lubricant reservoir, a supply conduit communicating with said bearings, a lubricating pump having its discharge outlet connected to said supply conduit and operative to supply lubricant under pressure from said reservoir to said supply conduit, a scavenge conduit, a scavenge pump discharging into said reservoir and having an intake communicating with said scavenge conduit, and ejectors interposed between said supply and scavenge conduits and constructed and arranged to eject excess lubricant from said bearings into said scavenge conduit, each of said ejectors comprising a motivating fluid entryway connected to said supply conduit, an exhaust passage connected to the scavenge conduit, and a Venturi throat communicating with the associated bearing.

6. In a lubricating system for a gas turbine engine operative at high altitude, a lubricant supply pump, a supply conduit connecting the discharge outlet of said supply pump to the lubrication zones of said engine, a scavenge pump, and ejectors mounted adjacent the respective lubrication zones, each ejector including an inlet communicating with said supply conduit, a Venturi passage connected to the adjacent lubrication zone, and a diffuser passage communicating with the intake of said scavenge pump, each ejector being motivated by lubricant flowing from said supply pump to said scavenge pump to draw lubricant from the adjacent zone into the Venturi passage and to elevate pressure thereof in the diffuser passage for facilitating discharge to said scavenge pump intake, whereby said scavenge pump is maintained operative under rarefied atmospheric conditions independently of inherent minimum inlet pressure characteristics.

7. In a lubricating system for a gas turbine engine operative at high altitude, a lubricant supply pump having a discharge outlet connected to the lubrication zones of said engine, a scavenge pump, a plurality of ejectors associated with the respective zones of the engine to be scavenged, and a common scavenge conduit communicating with the intake of said scavenge pump, each of said ejectors including an inlet communicating with the discharge of said supply pump, a Venturi scavenging passage communicating with said inlet and with the zone to be scavenged, and a diffuser outlet communicating with said Venturi passage and with said scavenge conduit,, each ejector being motivated by flow of lubricant from said supply pump toward said scavenge pump to draw lubricant from the adjacent zone by way of the Venturi passage and to elevate pressure of such lubricant for facilitating discharge thereof to said scavenge pump intake, whereby said scavenge pump is maintained operative under rarefied atmospheric conditions independently of inherent minimum inlet pressure characteristics.

LOUIS ROSSETTO.

REFERENCES CITED

The following references are of record in the file of this patent:

UNITED STATES PATENTS

| Number | Name | Date |
| --- | --- | --- |
| 1,728,268 | Flanders | Sept. 17, 1929 |
| 1,893,040 | Schmidt | Jan. 3, 1933 |
| 2,402,467 | Thompson | June 18, 1946 |